United States Patent
Ngo et al.

[11] Patent Number: 5,881,274
[45] Date of Patent: Mar. 9, 1999

[54] METHOD AND APPARATUS FOR PERFORMING ADD AND ROTATE AS A SINGLE INSTRUCTION WITHIN A PROCESSOR

[75] Inventors: Hung C. Ngo; Joel A. Silberman; Sang H. Dhong, all of Austin, Tex.

[73] Assignee: International Business Machines Corporation, Armonk, N.Y.

[21] Appl. No.: 900,261

[22] Filed: Jul. 25, 1997

[51] Int. Cl.[6] ............................. G06F 9/302; G06F 9/305; G06F 9/315

[52] U.S. Cl. ...................... 395/562; 364/787.01; 395/564

[58] Field of Search ................... 395/562, 564, 395/565; 364/787.01, 787.02, 787.03, 878.04

[56] References Cited

U.S. PATENT DOCUMENTS

| | | | |
|---|---|---|---|
| 3,814,925 | 6/1974 | Spannagel | 364/787.01 |
| 4,180,861 | 12/1979 | Armstrong et al. | 395/565 |
| 5,166,899 | 11/1992 | Lamb | 364/787.04 |
| 5,247,668 | 9/1993 | Smith et al. . | |
| 5,276,635 | 1/1994 | Naini et al. | 364/787.04 |
| 5,329,477 | 7/1994 | Kudou . | |
| 5,471,410 | 11/1995 | Bailey et al. . | |
| 5,481,689 | 1/1996 | Stamm et al. . | |
| 5,493,524 | 2/1996 | Guttag et al. . | |
| 5,535,347 | 7/1996 | Grochowski et al. . | |
| 5,581,497 | 12/1996 | Kumar | 364/787.02 |
| 5,701,504 | 12/1997 | Timko | 364/787.01 |
| 5,727,225 | 3/1998 | Guttage et al. | 395/562 |

OTHER PUBLICATIONS

U.S. Ser. No. 08/716,818, IBM Patent Application, filed Sep. 16, 1996, "Multifunctional Marcro," pp. 1–28.

IBM Technical Disclosure Bulletin, "High Speed Multiply Using A 5–Way Adder," Vo. 33, No. 6B, Nov. 1990, pp. 315–317.

*Primary Examiner*—William M. Treat
*Attorney, Agent, or Firm*—Casimer K. Salys; Antony P. Ng; Andrew J. Dillon

[57] ABSTRACT

An apparatus for performing ADD and ROTATE as a single instruction within a processor is disclosed. In accordance with a preferred embodiment of the present invention, the apparatus comprises an adder and a rotator. The adder is utilized for adding a first number to a second number in a multiple stages to yield a carry-out and a sum output. During each of these stages, the adder produces a group generate value and a group propagate value. The rotator is utilized for rotating the group propagate value and the group generate value at each of the stages before the yielding of the carry-out and the sum output. As such, both ADD and ROTATE instructions can be completed within a single processor cycle.

6 Claims, 2 Drawing Sheets

METHOD AND APPARATUS FOR PERFORMING ADD AND ROTATE AS A SINGLE INSTRUCTION WITHIN A PROCESSOR

BACKGROUND OF THE INVENTION

1. Technical Field

The present invention relates to a method and apparatus for data processing in general, and in particular to a method and apparatus for processing instructions within a processor. Still more particularly, the present invention relates to a method and apparatus for performing ADD and ROTATE as a single instruction within a processor.

2. Description of the Prior Art

An addition operation forms the basis for many other processing operations within a processor, from counting to multiplying to filtering. As a result, from a processor design standpoint, there is a tremendous incentive to improve the speed of any adder circuit that perform addition operations by which two binary numbers are added together.

Accordingly, a significant amount of silicon area is devoted in most general purpose processors for the execution of fixed point and/or integer ADD instructions such that each of these ADD instructions can be completed within a single processor cycle. Occasionally, a separate macro may even be dedicated to execute these ADD instructions, with the macro design optimized for addition operations. A macro is defined as a collection of circuits designed to perform an operation on multiple inputs to produce an output.

Under the prior art, an ADD instruction followed by a ROTATE instruction for the sum from the ADD instruction requires at least two processor cycles to complete. In order to further improve the processor performance by staying true to the philosophy of improving the performance of added circuits within the processor as discussed above, it would be desirable to provide a method and apparatus for performing both ADD and ROTATE instructions as a single instruction. As such, both ADD and ROTATE instructions can be completed within a single processor cycle.

SUMMARY OF THE INVENTION

In view of the foregoing, it is therefore an object of the present invention to provide an improved method and apparatus for data processing.

It is another object of the present invention to provide an improved method and apparatus for processing instructions within a processor.

It is yet another object of the present invention to provide an improved method and apparatus for performing ADD and ROTATE as a single instruction within a processor.

In accordance with a preferred embodiment of the present invention, an apparatus within a processor for performing both ADD and ROTATE as a single instruction comprises an adder and a rotator. The adder is utilized for adding a first number to a second number in a multiple stages to yield a carry-out and a sum output. During each of these stages, the adder produces a group generate value and a group propagate value. The rotator is utilized for rotating the group propagate value and the group generate value at each of the stages before the yielding of the carry-out and the sum output. As such, both ADD and ROTATE instructions can be completed within a single processor cycle.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
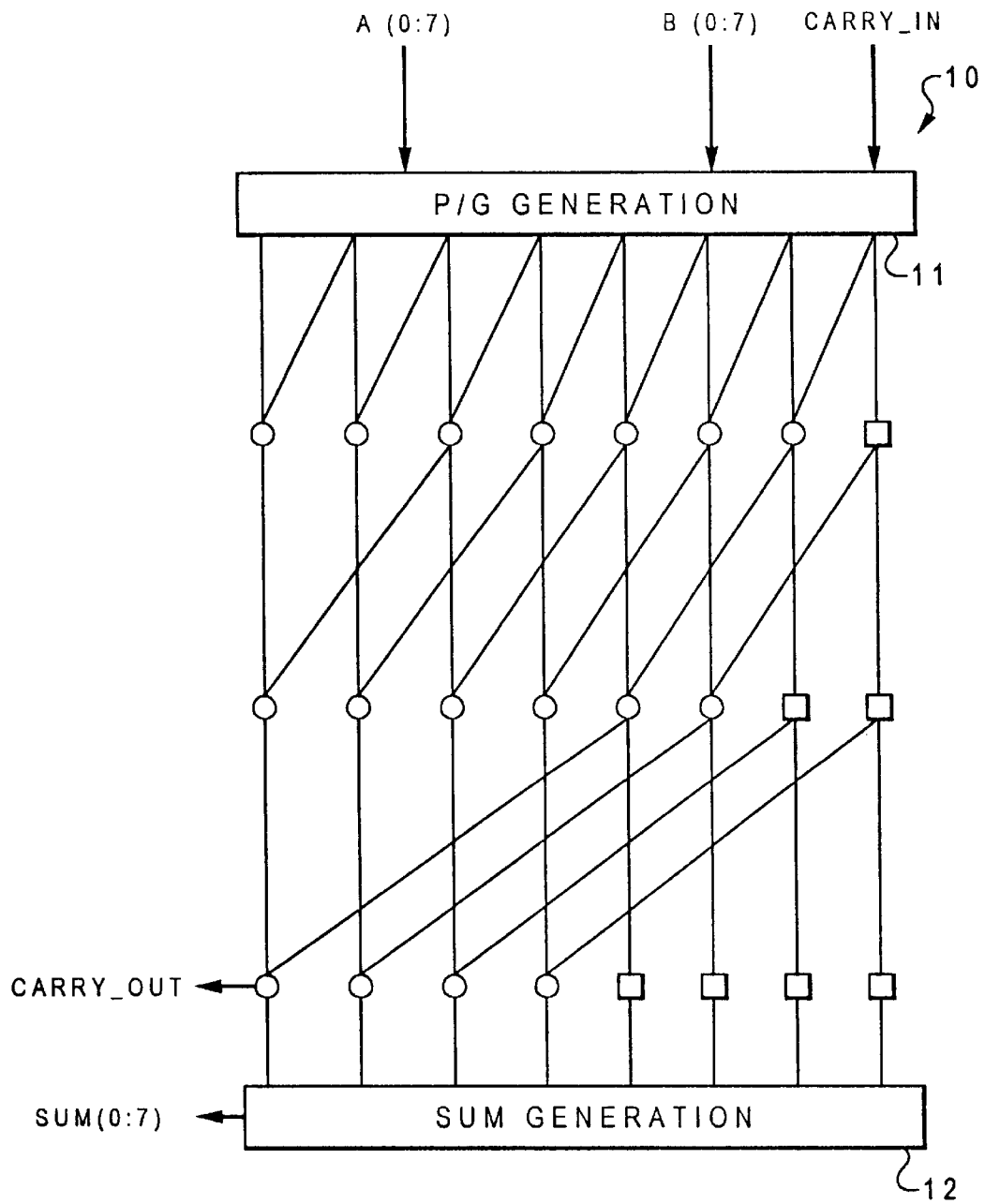
FIG. 1 is a block diagram of a typical carry-lookahead adder under the prior art.

Referring now to the drawings and, in particular, to FIG. 1, there is depicted a block diagram of a typical eight-bit carry-lookahead adder under the prior art. As shown, carry-lookahead adder 10 includes a P/G generation block 11 and a sum generation block 12. P/G generation block 11 takes two 8-bit inputs, such as input A and input B, and produces a propagate signal (p) and a generate signal (g) for each bit of the two inputs. The propagate and the generate signals are then combined in a network having two types of cells.

Figure 2:
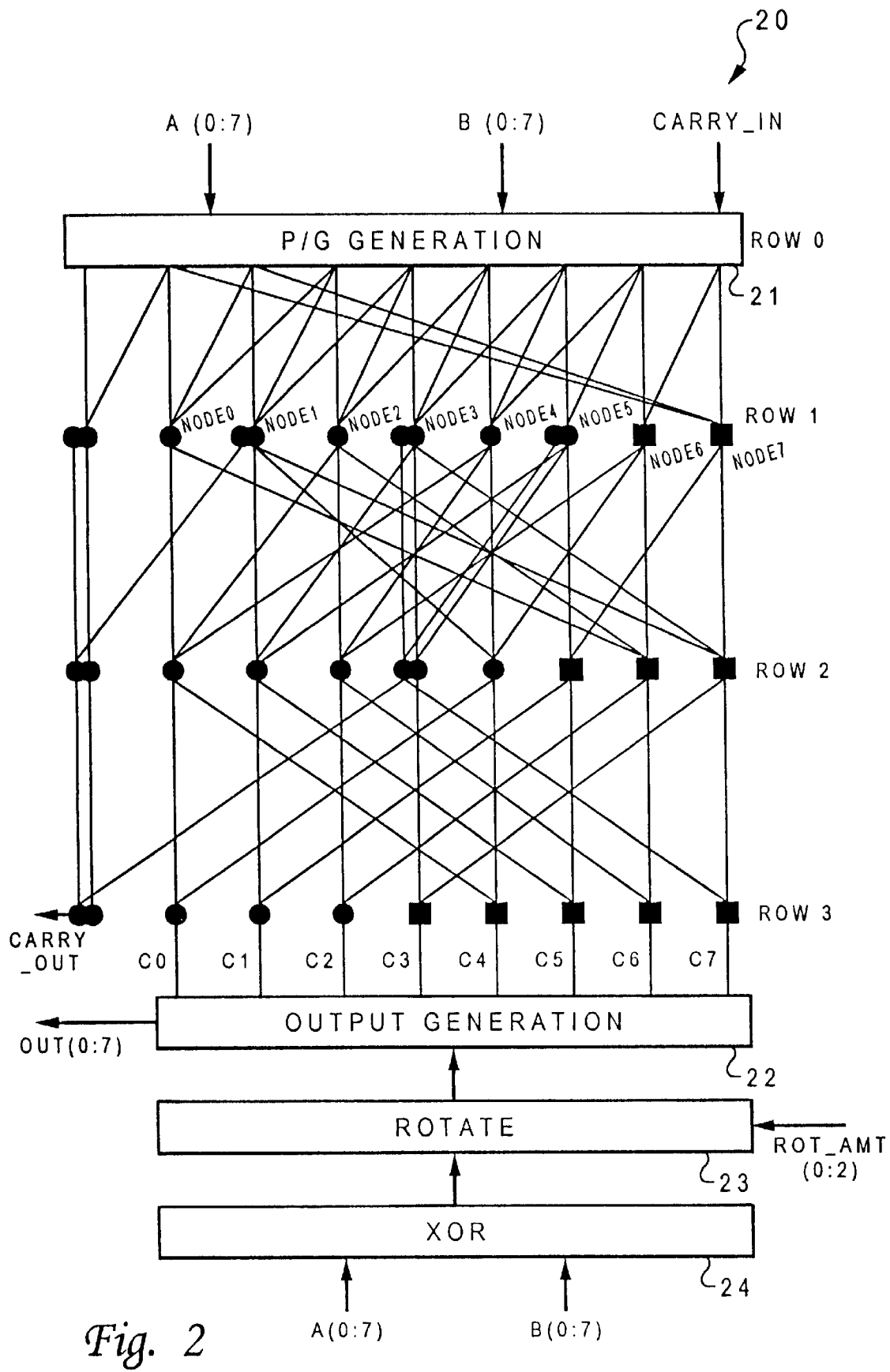
FIG. 2 is a block diagram of an add-rotator in accordance with a preferred embodiment of the present invention.

The first type of cells, represented by circles in FIG. 1, are utilized to calculate a group propagate signal, P, and a group generate signal, G. Group propagate signal, P, is formulated by performing $P_i = P_i \cdot g_j$ while group generate signal, G, is formulated by performing $G_i = g_i + p_i \cdot g_j$. Under the above description, a plus sign (+) represents a logical OR operation, while a dot sign (·) represents an logical AND operation. The second type of cells, represented by squares in FIG. 2, is a buffer having outputs $P_i = p_i$ and $G_i = g_i$. Note that the second type of cells within the network utilized to calculate P does not include any terms that involves $g_i$.

As for the CARRY_OUT, a CARRY_OUT of an $i^{th}$ stage, $C_i$, may be expressed as $$C_i = G_i + P_i \cdot C_{i-1}$$

where $$P_i = A_i \oplus B_i$$

$$G_i = A_i \cdot B_i$$

The SUM, $S_i$, is generated by $S_i = C_{i-1} \oplus A_i \oplus B_i$.

At the output of carry-lookahead adder 10, sum generation block 12 takes $P_i$ and $G_i$ signals to produce an eight-bit SUM output. One feature of this binary carry-lookahead adder architecture is that the interconnection of group propagate cells and group generate cells resembles a logarithmic shifter.

In order to performed an ADD instruction followed by a ROTATE instruction under the prior art, the ADD instruction is first executed by carry-lookahead adder 10, and the ROTATE instruction will then be performed with the SUM obtained from sum generation block 12. If an ADD instruction requires one processor cycle to complete and a ROTATE instruction requires another processor cycle to complete, then an ADD instruction followed by a ROTATE instruction will take at least two processor cycles to complete.

The present invention modifies the binary carry-lookahead adder of FIG. 1 so that an ADD instruction and a ROTATE instruction can be executed simultaneously as a single instruction. Accordingly, an ADD and ROTATE instruction can be performed within a single processor cycle. In addition, an adder-rotator under the present invention can also execute a single instruction ADD or ROTATE separately.

With reference now to FIG. 2, there is depicted a block diagram of a add-rotator in accordance with a preferred embodiment of the present invention. Add-rotator 20 includes a rotator incorporated within an adder such that during each stage of the addition operation, a carry-out and a sum are rotated accordingly.

As shown in FIG. 2, two eight-bit inputs, namely, input A and input B, are utilized to generate a propagate signal (p) and a generate signal (g) for each bit of the inputs. Each propagate signal and general signal are then combined in a network having two types of cells to formulate a group propagate signal, P, and a group generate signal, G.

The first type of cells, represented by solid circles in FIG. 2, are utilized to calculate a group propagate signal, P, and a group generate signal, G. The second type of cells, represented by solid squares in FIG. 2, are buffers having outputs identical to their respective inputs. The final result is that carry bits from each row (or cell layer) have already been rotated by an amount specified by ROT_AMT. In addition, the nodes represented by double solid circles are designed to calculate CARRY_OUT signal, independent of the rotations.

As for the half-sum calculation, input A and input B are first XORed within XOR block 24. The results from XOR block 24 are then rotated in ROTATE block 23 by the amount specified by ROT_AMT in order to generate a halfsum signal, before the arrival at output generation block 22. As a result, all the halfsum signals are also rotated by the amount specified by ROT_AMT. The rotated halfsum signals and the rotated carry signals are finally combined in output generation block 22 to produce an output, OUT, that is in essence a sum of input A and input B, rotated by the amount specified by ROT_AMT.

As a preferred embodiment of the present invention, for each node within the carry generation network, there is an additional input to produce a rotated signal. For example, in row 1, NODE 0 (bit 1) has inputs from bit 1, bit 2, and bit 3 from P/G generation block 21. When ROT_AMT(2) is equal to 0 (rotate 0 bit), P(1) and P(2) are combined to generate group P2 of bit 1. When ROT_AMT(2) is equal to 1 (rotate 1 bit), P(2) and P(3) are combined to generate group P2 of bit 1. For NODE 7 (CARRY_IN) in row 1, the choice is between buffering the CARRY_IN signal or generating group P2 and group G2 of bit 1, in case of ROT_AMT(2) is 1.

For all the nodes in row 2, the generation of group propagate signal, P, and group generate signal, G, depends on both ROT_AMT(1) and ROT_AMT(2). If ROT_AMT(1) is equal to 0, and there is no rotation in row 1, Ps and Gs are generated as described above. However, if there is a rotation in row 1, each node has to be determined as to whether or not the current bit needs to be buffered or combined with a lower order bit. For example, if ROT_AMT(1) is equal to 0 and ROT_AMT(2) is also equal to 0, NODE 7 (bit 7) in row 2 will be buffered. but, if ROT_AMT(1) is equal to 0 and ROT_AMT(2) is equal to 1, then group P4 and group G4 will be generated as shown below:

$$P4_{2\text{-}7}=P2_{1\text{-}7} \cdot P2_{1\text{-}1}$$

$$G4_{2\text{-}7}=G2_{1\text{-}7}+P2_{1\text{-}7} \cdot G2_{1\text{-}1}$$

Note: $Px_{y\text{-}z}$ denotes P of row y, node z, and having a group size x, and $Gx_{y\text{-}z}$ denotes G of row y, node z, and having a group size x. If ROT_AMT(1) is equal to 1, then group P4 and group G4 of bit 7 will be generated as shown below:

$$P4_{2\text{-}7}=P2_{i\text{-}1} \cdot P2_{1\text{-}3}$$

$$G4_{2\text{-}7}=G2_{1\text{-}1}+P2_{1\text{-}1} \cdot G2_{1\text{-}3}$$

Similarly, each node in rows 3 takes previous rotations in row 1 and row 2 into consideration before generating a carry signal. A complete list of the logic of generating all the nodes within the cell network of adder-rotator is shown in Table I.

TABLE I

| | ROW 1 | |
|---|---|---|
| | ROT_AMT(2) | OUT |
| NODE 7 | 0 | $G2_{1\text{-}7}$ = CARRY_IN |
| | 1 | $G2_{1\text{-}7}$ = G(1) + P(1)G(2) |
| | 1 | $P2_{1\text{-}7}$ = P(1)P(2) |
| NODE 6 | 0 | $G2_{1\text{-}6}$ = G(7) |
| | 1 | $G2_{1\text{-}6}$ = CARRY_IN |
| NODE 5 | 0 | $G2_{1\text{-}5}$ = G(6) + P(6)G(7) |
| | 1 | $G2_{1\text{-}5}$ = G(7) |
| NODE 4 | 0 | $G2_{1\text{-}4}$ = G(5) + P(5)G(6) |
| | | $P2_{1\text{-}4}$ = P(5)P(6) |
| | 1 | $G2_{1\text{-}4}$ = G(6) + P(6)G(7) |
| NODE 3 | 0 | $G2_{1\text{-}3}$ = G(4) + P(4)G(5) |
| | | $P2_{1\text{-}3}$ = P(4)P(5) |
| | 1 | $G2_{1\text{-}3}$ = G(5) + P(5)G(6) |
| | | $P2_{1\text{-}3}$ = P(5)P(6) |
| NODE 2 | 0 | $G2_{1\text{-}2}$ = G(3) + P(3)G(4) |
| | | $P2_{1\text{-}2}$ = P(3)P(4) |
| | 1 | $G2_{1\text{-}2}$ = G(4) + P(4)G(5) |
| | | $P2_{1\text{-}2}$ = P(4)P(5) |
| NODE 1 | 0 | $G2_{1\text{-}1}$ = G(2) + P(2)G(3) |
| | | $P2_{1\text{-}1}$ = P(2)P(3) |
| | 1 | $G2_{1\text{-}1}$ = G(3) + P(3)G(4) |
| | | $P2_{1\text{-}1}$ = P(3)P(4) |
| NODE 0 | 0 | $G2_{1\text{-}0}$ = G(1) + P(1)G(2) |
| | | $P2_{1\text{-}0}$ = P(1)P(2) |
| | 1 | $G2_{1\text{-}0}$ = G(2) + P(2)G(3) |
| | | $P2_{1\text{-}0}$ = P(2)P(3) |

| | ROW 2 | | |
|---|---|---|---|
| | ROT_AMT(1) | ROT_AMT(2) | OUT |
| NODE 7 | 0 | 0 | $G4_{2\text{-}7}$ = $G2_{1\text{-}7}$ |
| | 0 | 1 | $G4_{2\text{-}7}$ = $G2_{1\text{-}7}$ + $P2_{1\text{-}7}$ $G2_{1\text{-}1}$ |
| | | | $P4_{2\text{-}7}$ = $P2_{1\text{-}7}$ $P2_{1\text{-}1}$ |
| | 1 | don't care | $G4_{2\text{-}7}$ = $G2_{1\text{-}1}$ + $P_{1\text{-}1}$ $G2_{1\text{-}3}$ |
| | | | $P4_{2\text{-}7}$ = $P2_{1\text{-}1}$ $P2_{1\text{-}3}$ |
| NODE 6 | 0 | don't care | $G4_{2\text{-}6}$ = $G2_{1\text{-}6}$ |
| | 1 | don't care | $G4_{2\text{-}6}$ = $G2_{1\text{-}0}$ + $P2_{1\text{-}0}$ $G2_{1\text{-}2}$ |
| | | | $P4_{2\text{-}6}$ = $P2_{1\text{-}0}$ $P2_{1\text{-}2}$ |
| NODE 5 | 0 | don't care | $G4_{2\text{-}5}$ = $G2_{1\text{-}5}$ |
| | 1 | 0 | $G4_{2\text{-}5}$ = $G2_{1\text{-}7}$ |
| | 1 | 1 | $G4_{2\text{-}5}$ = $G2_{1\text{-}7}$ + $P2_{1\text{-}7}$ $G2_{1\text{-}1}$ |
| | | | $P4_{2\text{-}5}$ = $P2_{1\text{-}7}$ $P2_{1\text{-}1}$ |
| NODE 4 | 0 | 0 | $G4_{2\text{-}4}$ = $G2_{1\text{-}4}$ + $P2_{1\text{-}4}$ $G2_{1\text{-}6}$ |
| | 0 | 1 | $G4_{2\text{-}4}$ = $G2_{1\text{-}4}$ |
| | 1 | don't care | $G4_{2\text{-}4}$ = $G2_{1\text{-}6}$ |
| NODE 3 | 0 | don't care | $G4_{2\text{-}3}$ = $G2_{1\text{-}3}$ + $P2_{1\text{-}3}$ $G2_{1\text{-}5}$ |
| | 1 | don't care | $G4_{2\text{-}3}$ = $G2_{1\text{-}5}$ |
| NODE 2 | 0 | 0 | $G4_{2\text{-}2}$ = $G2_{1\text{-}2}$ + $P2_{1\text{-}2}$ $G2_{1\text{-}4}$ |
| | | | $P4_{2\text{-}2}$ = $P2_{1\text{-}2}$ $P2_{1\text{-}4}$ |
| | 0 | 1 | $G4_{2\text{-}2}$ = $G2_{1\text{-}2}$ + $P2_{1\text{-}2}$ $G2_{1\text{-}4}$ |
| | 1 | 0 | $G4_{2\text{-}2}$ = $G2_{1\text{-}4}$ + $P2_{1\text{-}4}$ $G2_{1\text{-}6}$ |
| | 1 | 1 | $G4_{2\text{-}2}$ = $G2_{1\text{-}4}$ |
| NODE 1 | 0 | don't care | $G4_{2\text{-}1}$ = $G2_{1\text{-}1}$ + $P2_{1\text{-}1}$ $G2_{1\text{-}3}$ |
| | | | $P4_{2\text{-}1}$ = $P2_{1\text{-}1}$ $P2_{1\text{-}3}$ |
| | 1 | don't care | $G4_{2\text{-}1}$ = $G2_{1\text{-}3}$ + $P2_{1\text{-}3}$ $G2_{1\text{-}5}$ |
| NODE 0 | 0 | don't care | $G4_{2\text{-}0}$ = $G2_{1\text{-}0}$ + $P2_{1\text{-}0}$ $G2_{1\text{-}2}$ |
| | | | $P4_{2\text{-}0}$ = $P2_{1\text{-}0}$ $P2_{1\text{-}2}$ |
| | 1 | 0 | $G4_{2\text{-}0}$ = $G2_{1\text{-}2}$ + $P2_{1\text{-}2}$ $G2_{1\text{-}4}$ |
| | | | $P4_{2\text{-}0}$ = $P2_{1\text{-}2}$ $P2_{1\text{-}4}$ |
| | 1 | 1 | $G4_{2\text{-}0}$ = $G2_{1\text{-}2}$ + $P2_{1\text{-}2}$ $G2_{1\text{-}4}$ |

TABLE I-continued

ROW 3

| | ROT_AMT(0) | ROT_AMT(1) or ROT_AMT(2) | OUT |
|---|---|---|---|
| NODE 7 | 0 | 0 | $C7 = G4_{2\text{-}7}$ |
| | 0 | 1 | $C7 = G4_{2\text{-}7} + P4_{2\text{-}7}\ G4_{2\text{-}3}$ |
| | 1 | don't care | $C7 = G4_{2\text{-}3}$ |
| NODE 6 | 0 | 0 ROT_AMT(1) only | $C6 = G4_{2\text{-}6}$ |
| | 0 | 1 ROT_AMT(1) only | $C6 = G4_{2\text{-}6} + P4_{2\text{-}6}\ G4_{2\text{-}2}$ |
| | 1 | 0 | $C6 = G4_{2\text{-}2} + P4_{2\text{-}2}\ G4_{2\text{-}6}$ |
| | 1 | 1 | $C6 = G4_{2\text{-}2}$ |
| NODE 5 | 0 | 0 ROT_AMT(1) & (2) | $C5 = G4_{2\text{-}5}$ |
| | 0 | 1 ROT_AMT(1) & (2) | $C5 = G4_{2\text{-}5} + P4_{2\text{-}5}\ G4_{2\text{-}1}$ |
| | 1 | 0 ROT_AMT(1) only | $C5 = G4_{2\text{-}1} + P4_{2\text{-}1}\ G4_{2\text{-}5}$ |
| | 1 | 1 ROT_AMT(1) only | $C5 = G4_{2\text{-}1}$ |
| NODE 4 | 0 | don't care | $C4 = G4_{2\text{-}4}$ |
| | 1 | 0 ROT_AMT(1) & (2) | $C4 = G4_{2\text{-}0} + P4_{2\text{-}0}\ G4_{2\text{-}4}$ |
| | 1 | 1 ROT_AMT(1) & (2) | $C4 = G4_{2\text{-}0}$ |
| NODE 3 | 0 | don't care | $C3 = G4_{2\text{-}3}$ |
| | 1 | 0 | $C3 = G4_{2\text{-}7}$ |
| | 1 | 1 | $C3 = G4_{2\text{-}7} + P4_{2\text{-}7}\ G4_{2\text{-}3}$ |
| NODE 2 | 0 | 0 | $C2 = G4_{2\text{-}2} + P4_{2\text{-}2}\ G4_{2\text{-}6}$ |
| | 0 | 1 | $C2 = G4_{2\text{-}2}$ |
| | 1 | 0 ROT_AMT(1) only | $C2 = G4_{2\text{-}6}$ |
| | 1 | 1 ROT_AMT(1) only | $C2 = G4_{2\text{-}6} + P4_{2\text{-}6}\ G4_{2\text{-}2}$ |
| NODE 1 | 0 | 0 ROT_AMT(1) only | $C1 = G4_{2\text{-}1} + P4_{2\text{-}1}\ G4_{2\text{-}5}$ |
| | 0 | 1 ROT_AMT(1) only | $C1 = G4_{2\text{-}1}$ |
| | 1 | 0 ROT_AMT(1) & (2) | $C1 = G4_{2\text{-}5}$ |
| | 1 | 1 ROT_AMT(1) & (2) | $C1 = G4_{2\text{-}5} + P4_{2\text{-}5}\ G4_{2\text{-}1}$ |
| NODE 0 | 0 | 0 ROT_AMT(1) & (2) | $C0 = G4_{2\text{-}0} + P4_{2\text{-}0}\ G4_{2\text{-}4}$ |
| | 0 | 1 ROT_AMT(1) & (2) | $C0 = G4_{2\text{-}0}$ |
| | 1 | don't care | $C0 = G4_{2\text{-}4}$ | note: $G(7) = A(7) \cdot B(7) + CARRY\_IN \cdot (A(7) + B(7))$

As has been described, the present invention provides an improved method and apparatus for performing ADD and ROTATE as a single instruction within a processor. Throughout this disclosure, an eight-bit add-rotator is utilized for the purpose of illustration. However, it is understood by those who are skilled in the relevant art that the same principle as described in the present disclosure may also be applicable to an add-rotator of any size.

While the invention has been particularly shown and described with reference to a preferred embodiment, it will be understood by those skilled in the art that various changes in form and detail may be made therein without departing from the spirit and scope of the invention.

What is claimed is:

1. An apparatus for performing an ADD instruction and a ROTATE instruction as a single instruction within a processor, said apparatus comprising:

an adder means for adding a first number to a second number utilizing a plurality of stages to yield a carry-out and a sum, wherein said adder means produces a group generate value and a group rotate value at each of said plurality of stages; and a rotator means for rotating said group generate value and said group rotate value at each of said plurality of stages before said yielding of said carry-out and said sum.

2. The apparatus for performing an ADD instruction and a ROTATE instruction within a processor according to claim 1, wherein said apparatus further includes a first input for said first number, a second input for said second number, a CARRY_IN input, and a ROT_AMT input.

3. The apparatus for performing an ADD instruction and a ROTATE instruction within a processor according to claim 1, wherein said apparatus further includes a SUM output for said sum and a CARRY_OUT output for said carry-out.

4. The apparatus for performing an ADD instruction and a ROTATE instruction within a processor according to claim 1, wherein said apparatus further includes an XOR block and a rotate block for generating a halfsum of said first number and said second number.

5. A method for performing an ADD instruction and a ROTATE instruction as a single instruction within a processor, said method comprising the steps of:

adding a first number to a second number utilizing a plurality of stages to yield a carry-out and a sum output, wherein said adding step produces a group generate value and a group rotate value at each of said plurality of stages; and rotating said group generate value and said group rotate value at each of said plurality of stages before said yielding of said carry-out and said sum output.

6. The method for performing an ADD instruction and a ROTATE instruction within a processor according to claim 5, wherein said method further includes a step of generating a halfsum by XORing and rotating said first number and said second number.

* * * * *

UNITED STATES PATENT AND TRADEMARK OFFICE
CERTIFICATE OF CORRECTION

PATENT NO. : 5,881,274
DATED : Mar. 9, 1999
INVENTOR(S): Ngo et al.

It is certified that error appears in the above-identified patent and that said Letters Patent is hereby corrected as shown below:

In Col. 4, TABLE I, line 56, please replace "$G4_{2-2} = G2_{1-2+P21-2}\ G2_{1-4}$" with
-- $G4_{2-2} = G2_{1-2} + P2_{1-2}\ G2_{1-4}$ --

In Col. 5, TABLE 1, line 27, please replace "$C2 = G4_{2-2} + P4_{2-2\ G42-6}$" with
-- $C2 = G4_{2-2} + P4_{2-2}\ G4_{2-6}$ --

Signed and Sealed this

Eighth Day of August, 2000

Attest:

Attesting Officer

Q. TODD DICKINSON

*Director of Patents and Trademarks*